United States Patent [19]

Chang

[11] Patent Number: 5,307,972
[45] Date of Patent: May 3, 1994

[54] PINCH ROLLER PRESSING DEVICE IN CAMERA-INTEGRATED TYPE VCR

[75] Inventor: Byung K. Chang, Seoul, Rep. of Korea

[73] Assignee: Goldstar Co., Ltd., Seoul, Rep. of Korea

[21] Appl. No.: 2,672

[22] Filed: Jan. 11, 1993

Related U.S. Application Data

[63] Continuation of Ser. No. 746,630, Aug. 19, 1991, abandoned.

[30] Foreign Application Priority Data

Aug. 21, 1990 [KR] Rep. of Korea ............ 12550/1990

[51] Int. Cl.$^5$ .................................. B65H 20/04
[52] U.S. Cl. .................................. 226/176; 226/181
[58] Field of Search .............. 226/174, 176, 177, 180, 226/181

[56] References Cited

U.S. PATENT DOCUMENTS

| | | |
|---|---|---|
| 3,257,056 | 6/1966 | Cederberg et al. ............... 226/176 |
| 3,373,913 | 3/1968 | Atsumi ............................ 226/176 |
| 3,572,571 | 3/1971 | Mori et al. ...................... 226/176 |
| 4,694,983 | 9/1987 | Suzuki .......................... 226/181 X |

FOREIGN PATENT DOCUMENTS

89-105354 4/1989 Japan .

*Primary Examiner*—Daniel P. Stodola
*Assistant Examiner*—Paul T. Bowen

[57] ABSTRACT

A pinch roller pressing device in a camera-integrated type VCR, comprising a cam gear provided with a vortex-type cam groove and an actuating lever provided at its one end with an actuating pin received in the cam groove of cam gear. A connecting lever is connected at one end thereof with the actuating lever, via a tension coil spring. A pinch roller lever is operatively connected to the connecting lever and provided at one end thereof with a pinch roller. A take-up arm is operatively connected to the pinch roller lever and provided at one end thereof with a guide shaft. The connecting lever has an engaging groove at the other end thereof, and the pinch roller lever has at one side of the lower surface thereof an engaging pin adapted to engage in the engaging groove. The device has a simple construction, thereby enabling more efficient use of the interior space of the appliance to which the device is applied. By virtue of the simple construction, the assembly and disassembly are also simplified.

5 Claims, 5 Drawing Sheets

PINCH ROLLER PRESSING DEVICE IN CAMERA-INTEGRATED TYPE VCR

This application is a continuation of application Ser. No. 07/746,630 filed on Aug. 19, 1991, now abandoned.

BACKGROUND OF THE INVENTION

The present invention relates to a pinch roller pressing device in a camera-integrated type VCR (hereinafter, referred to as a camcorder), and more particularly to a pinch roller pressing device in a camcorder, enabling its construction to be simplified and its assembly work to be easy.

Conventionally, there have been various types of pinch roller pressing devices used in camcorders. For example, Japanese Laid-open Patent Publication No. Pyeung 1-105354 discloses a mechanism for a pinch roller which is illustrated in the annexed drawings, FIGS. 4 to 7.

Referring to FIGS. 4 to 7, the conventional pinch roller pressing device for camcorder comprises a main chassis 20, a sub-chassis 30 disposed on the main chassis 20 to be movable frontwardly and rearwardly with respect to the main chassis 20, a reel chassis 40 mounted to the sub-chassis 30 to be movable frontwardly and rearwardly with respect to the main chassis 20.

The main chassis 20 is provided with a head cylinder 21 and a capstan shaft 22. At both side walls of the sub-chassis 30, a pair of guide slots 31 and 31' are formed, respectively. The reel chassis 40 is provided at its both side walls with a pair of guide pins 41 and 41' adapted to be received in and guided along said guide slots 31 and 31', respectively. At both sides of the upper portion, the reel chassis 40 also has a pair of reel posts 42 and 42', respectively. A pinch roller assembly 50 is disposed at one side of the reel chassis 40.

The pinch roller assembly 50 comprises a pinch roller lever 55 and a draw-out lever 56 rotatably mounted to respective spaced shafts 51 and 52 fixed on the reel chassis 40 and provided at their upper ends with a pinch roller 53 and a guide post 54, respectively, a connecting plate 57 adapted to connect said pinch roller lever 55 and said draw-out lever 56, a pressing lever 58 coaxially connected to the pinch roller lever 55, a coil spring 59 adapted to apply a resilient force to the pinch roller lever 55 and thus the draw-out lever 56, and a cam roller (not shown) rotatably mounted to the lower surface of said pressing lever 58. At the upper surface of the main chassis 20, a guide plate 23 adapted to guide the movement of cam roller is disposed to extend vertically.

In the drawings, reference numerals "24" and "24'" designate supply and take-up slant post bases, respectively.

In this conventional pinch roller pressing device of camcorder, the sub-chassis 30 and the reel chassis 40 are located at the front of the main chassis 20, under the tape unloading condition as shown in FIG. 5. Accordingly, the pinch roller assembly 50 mounted to the reel chassis 40 is positioned away from the capstan shaft 22.

When a tape loading signal is applied under the above-mentioned condition, the sub-chassis 30 and the reel chassis 40 are moved rearwardly along the main chassis 20. Simultaneously, the pinch roller assembly 50 is also moved rearwardly, since the cam roller is guided along the guide plate 23 of the main chassis 20.

At this time, the pressing lever 58 rotates about the shaft 51 in clockwise, according to the shape of the guide plate 23, in that the cam roller is guided along the guide plate 23 of the main chassis 20. As a result, the coil spring 59 is tensed, so that the pinch roller lever 55 rotates about the shaft 51 in clockwise. The draw-out lever 56 connected with the pinch roller lever 55 by means of the connecting plate 57 also rotates about the shaft 52.

Subsequently, under the tape loading condition shown in FIG. 6, the movements of the sub-chassis 30 and the reel chassis 40 are completed. The pinch roller 53 of the pinch roller lever 55 is pressed against the capstan shaft 22. The supply and take-up post bases 24 and 24' are moved along their normal paths, thereby causing a tape to be loaded.

Under the condition that the loading of tape is completed as above, the pinch roller 53 is resiliently in contact with the capstan shaft 22, by the resilient force of coil spring 59.

However, the above-mentioned device has complex construction including mainly three assemblies, that is, the main chassis 20, the sub-chassis 30 and the reel chassis 40. In the device, there is also a disadvantage of requiring many constituting elements and thus large occupying volume, thereby adversely affecting the compactness and the thinness of the deck. Due to the complex construction, the assembly and the disassembly for maintenance are also uneasy.

SUMMARY OF THE INVENTION

Therefore, an object of the invention is to provide a pinch roller pressing device in a camera-integrated type VCR, capable of the compactness and the thinness of deck, and the improved ability of assembly.

In accordance with the present invention, this object can be accomplished by providing a pinch roller pressing device in a camera-integrated type VCR, comprising: a main base; a cam gear rotatably mounted on said main base and provided with a vortex-type cam groove; an actuating lever pivotally mounted at its center portion to the main base by means of a shaft and provided at its one end with an actuating pin received in said cam groove of cam gear; a connecting lever rotatably mounted to said actuating lever, by means of a pin fixed to the actuating lever and connected at one end thereof with the actuating lever, via a tension coil spring; a pinch roller lever pivotally mounted to the main base and operatively connected to the connecting lever, said pinch roller lever having at one end thereof a pinch roller; and a take-up arm pivotally mounted to the main base and operatively connected to the pinch roller lever, said take-up arm having at one end thereof a guide shaft.

BRIEF DESCRIPTION OF THE DRAWINGS

Other object and aspects of the invention will become apparent from the following description of embodiments with reference to the accompanying drawings in which:

FIGS. 1 and 2 are plan views of a pinch roller pressing device in accordance with the present invention, wherein FIG. 1 shows its tape unloading condition, while FIG. 2 shows its tape loading condition;

FIGS. 5 and 6 are plan views of the conventional pinch roller pressing device, wherein FIG. 5 shows its tape unloading condition, while FIG. 6 shows its tape loading condition;

DETAILED DESCRIPTION OF THE PREFERRED EMBODIMENTS

Figure 1:
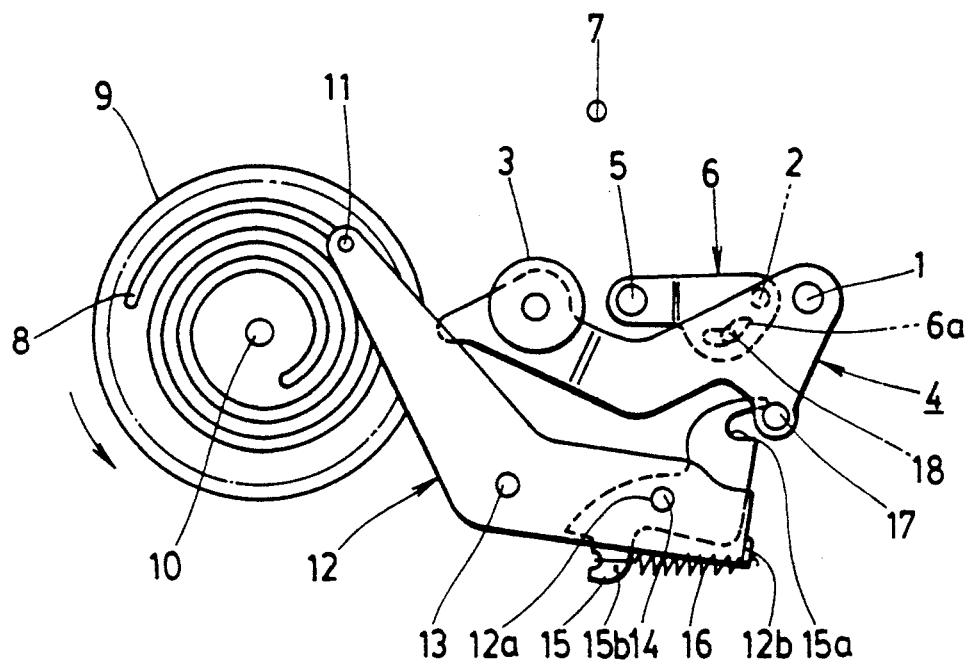
Figure 2:
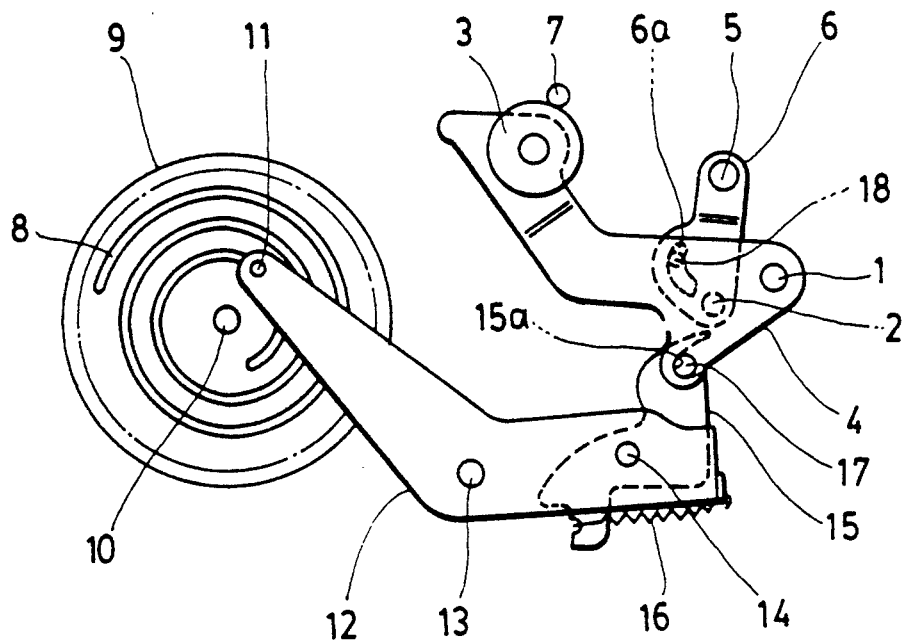
Figure 3:
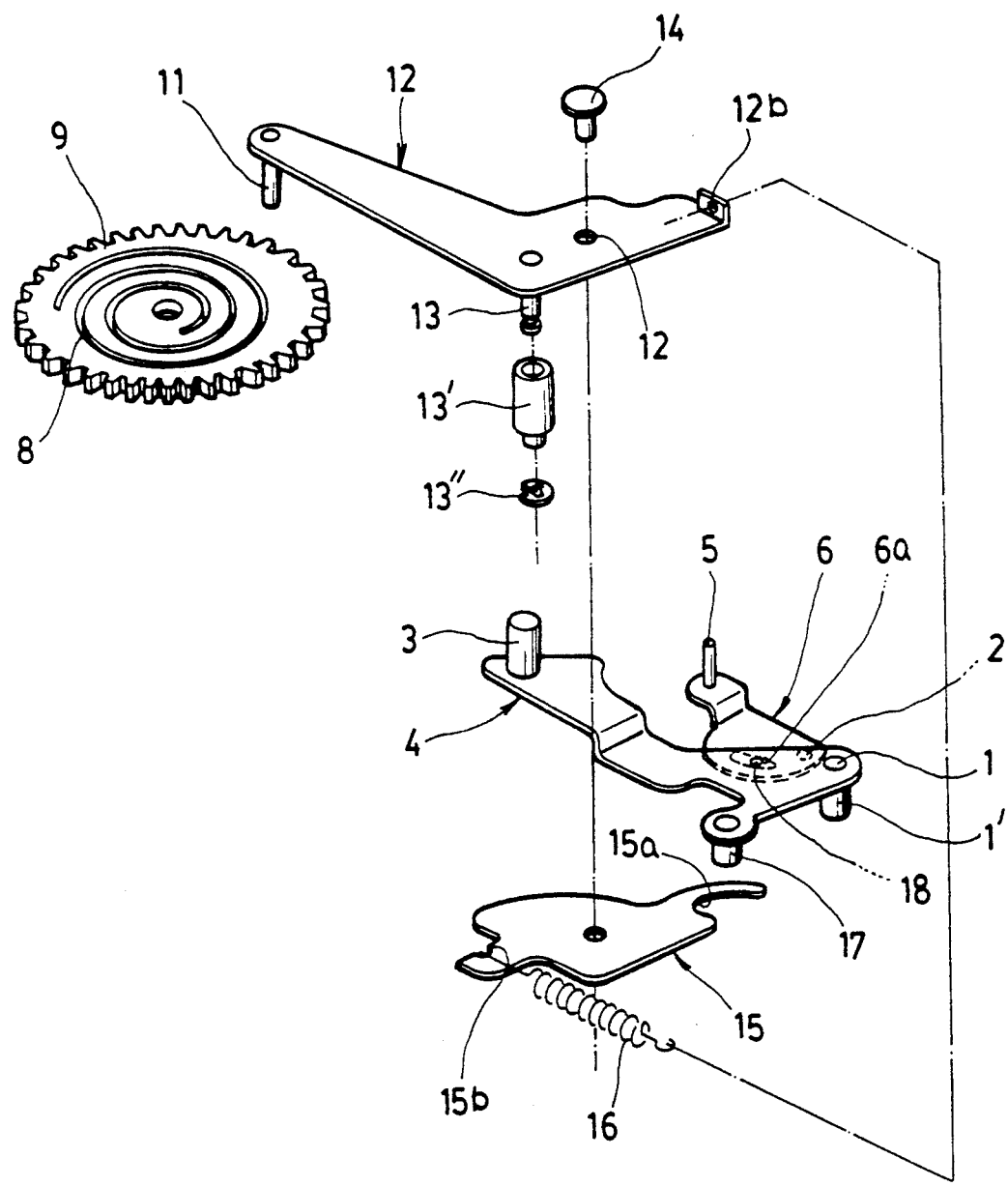
FIG. 3 is an exploded perspective view of the pinch roller pressing device of the present invention.
Figure 4:
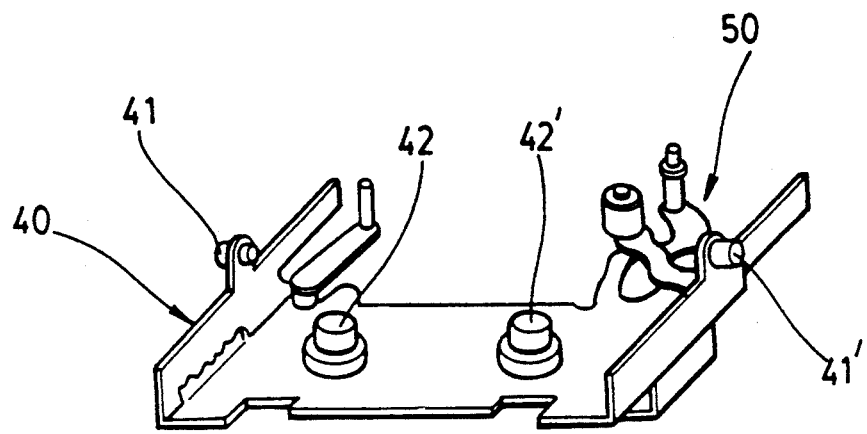
FIG. 4 is an exploded perspective view of a conventional pinch roller pressing device.
Figure 4:
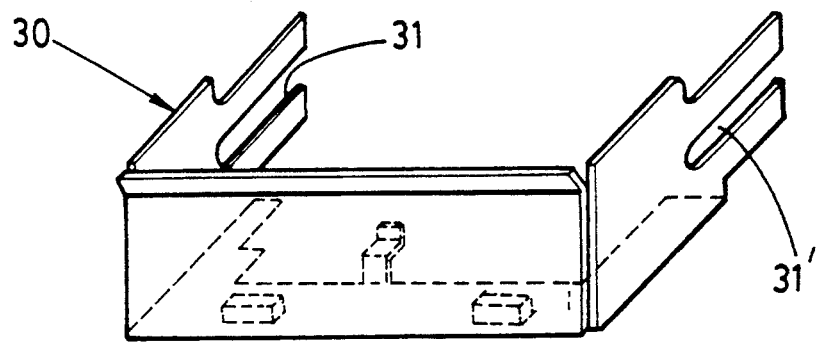
Figure 4:
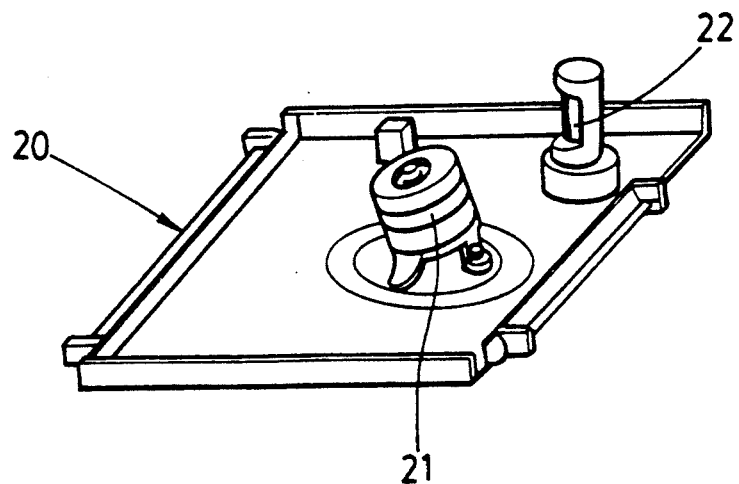
Figure 5:
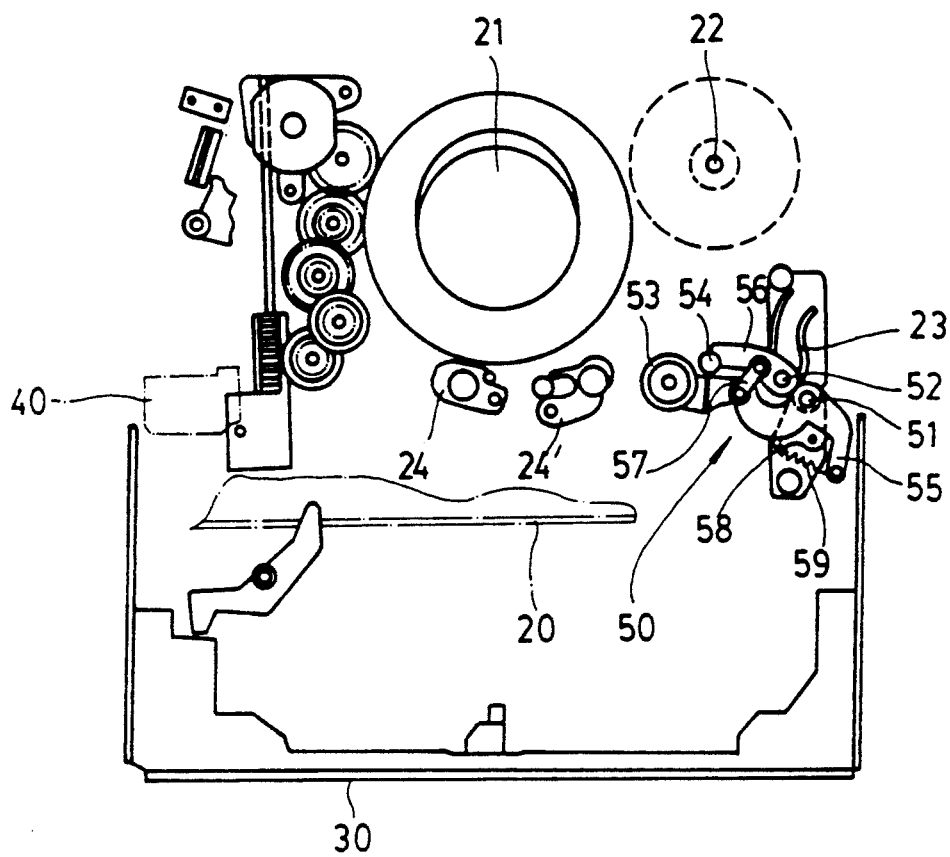
Figure 6:
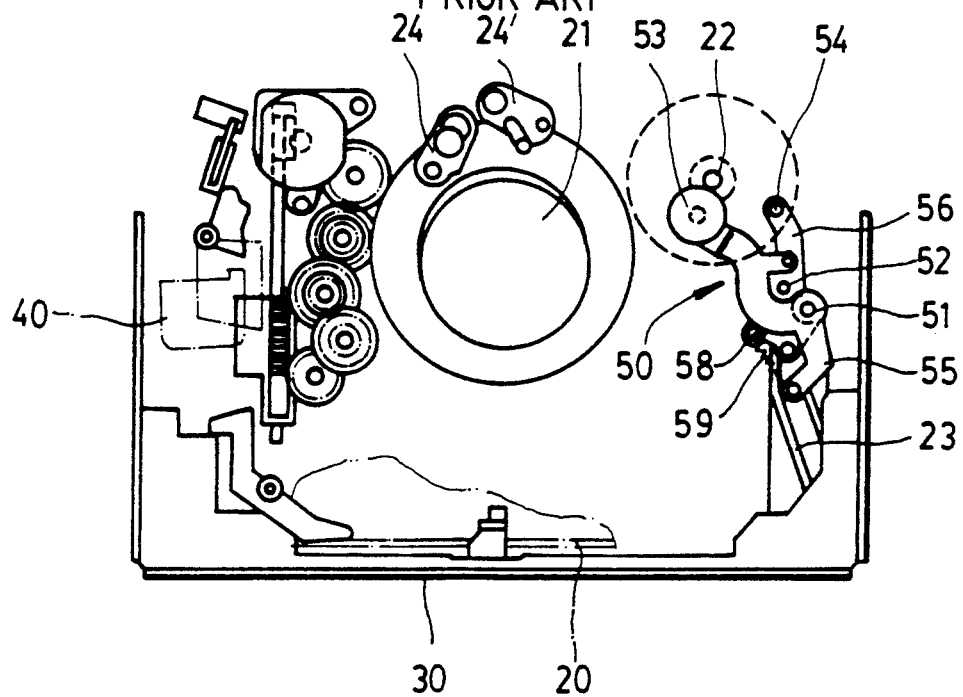
Figure 7:
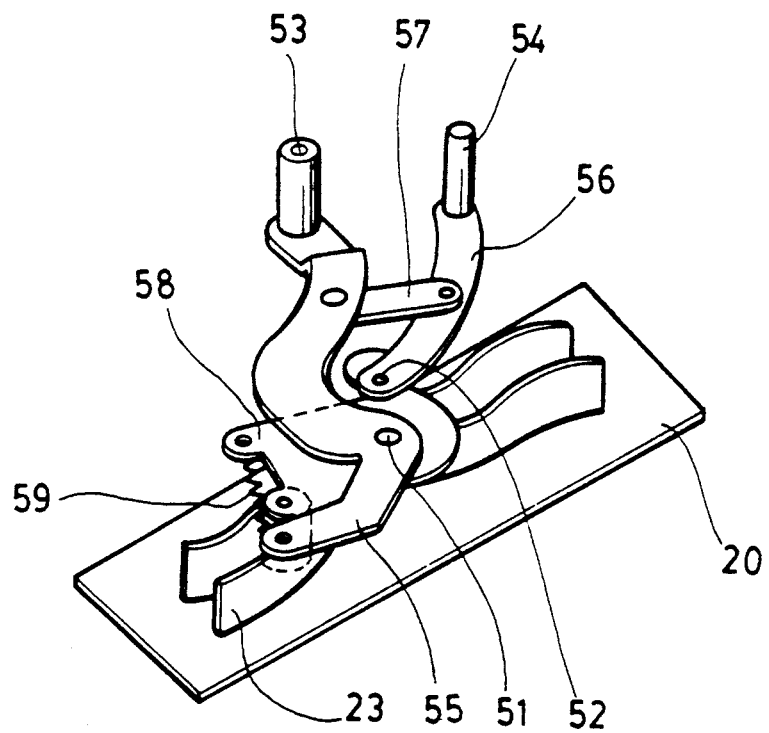
FIG. 7 is a perspective view of the main part of the conventional device.

FIGS. 1 and 2 are plan views of a pinch roller pressing device in accordance with the present invention, while FIG. 3 is an exploded perspective view of the pinch roller pressing device.

As shown in the drawings, the pinch roller pressing device of the present invention comprises a pinch roller lever 4 and a take-up arm 6 pivotally mounted to spaced shafts 1 and 2 fixedly mounted to a main base (not shown) to extend vertically, respectively. The pinch roller lever 4 is provided at one end thereof with a pinch roller 3. On the other hand, the take-up arm 6 is provided at one end thereof with a guide shaft 5. At the main base, a capstan shaft 7 is also fixedly mounted, to which the pinch roller 3 of the pinch roller lever 4 contacts selectively.

In accordance with the present invention, a cam gear 9 is rotatably mounted on the main base, by means of a shaft 10 fixedly mounted on the main base. The cam gear 9 is provided at its upper surface with a cam groove 8 of a certain shape such as, for example, a vortex-type. Near the cam gear 9, an actuating lever 12 is pivotally mounted to the main base, by means of a downwardly extending shaft 13. The shaft 13 is fixedly mounted to the center portion of the actuating lever 12 and rotatably mounted to the main base. The actuating lever 12 is provided at one end thereof with a guide pin 11 which is received in and guided along the cam groove 8 of the cam gear 9. Beneath the actuating lever 12, a connecting lever 15 is pivotally mounted to the actuating lever 12, by means of a pin 14 extending through a hole 12a formed the portion of the actuating lever 12 between the center portion and the other end of the actuating lever 12 and through a center hole of the connecting lever 15. In order to provide the operative connection between the pinch roller lever 4 and the actuating lever 12, the connecting lever 15 has at one end an engaging groove 15a and at the other end a mounting groove 15b. That is, the engaging groove 15a of the connecting lever 15 is engaged with a downwardly extending engaging pin 17 provided at the pinch roller lever 4. On the other hand, a tension coil spring 16 is disposed between the mounting groove 15b of the connecting lever 15 and a curved portion 12b of the actuating lever 12. In order to provide an operative connection between the pinch roller lever 4 and the take-up arm 6, the pinch roller lever 4 has a downwardly extending guide pin 18, while the take-up arm 6 has an arc cam slot 6a receiving said guide pin 10 and guiding it therealong.

In the drawings, reference numerals 1 and 13 designate spaced and fixed bushings respectively, and reference numeral 13 designates a washer.

Operation of the above-mentioned pinch roller pressing device of the camcoder will now be described.

FIG. 1 shows the tape unloading condition of the camcorder. Under the condition, the guide pin 11 of the actuating lever 12 is disposed in the outer portion of the cam groove 8 formed on the cam gear 9 so that the actuating lever 12 is maintained at the condition that it has been pivoted about the fixed shaft 13, in clockwise. Due to the clockwise pivotal movement of the actuating lever 12, the connecting lever 15 operatively connected to the actuating lever 12 via the tension coil spring 16 is also maintained at the condition that it has been pivoted about the pivot pin 14 in clockwise. Accordingly, the pinch roller lever 4 which is connected with the connecting lever 15 by the engagement between the engaging groove 15a and the engaging pin 17 are maintained at the condition that it has been pivoted about the fixed shaft 1, in anti-clockwise. At this state, the pinch roller 4 is maintained at the condition that it is separated from the capstan shaft 7. On the other hand, the take-up arm 6 is maintained at the condition that it has been pivoted about the fixed shaft 2, in anti-clockwise, because the guide pin 18 is engaged in the cam slot 6a of the take-up arm 6.

When a cassette tape is loaded in the camcoder and a tape loading signal is applied, under the above-mentioned condition, the cam gear 9 rotates in anti-clockwise by a conventional transmission system. According to the rotation of the cam gear 9, the actuating lever 12 in which the guide pin 11 is received in the cam groove 8 of cam gear 9 is pivoted about the fixed shaft 13 in anti-clockwise. At this time, the connecting lever 15 is also pivoted about the pin 14, together with the actuating lever 12.

As the actuating lever 12 causes pivots in anti-clockwise, the pinch roller lever 4 in which its engaging pin 17 engages in the engaging groove 15a of the connecting lever 15 is pivoted about the fixed shaft 1, in clockwise. Simultaneously, the take-up arm 6 pivots about the fixed shaft 2, in clockwise, since its cam slot 6a receives and guides the guide pin 18 of the pinch roller lever 4 therein.

The above-mentioned operation is continued until the pinch roller 3 contacts with the capstan shaft 7. At the beginning of the contact between the pinch roller 3 and the capstan shaft 7, there is no movements of the connecting lever 15, the pinch roller lever 4 and the take-up arm 6.

According to the design of the present invention, the cam gear 9 is designed to further rotate a certain angle from the above-mentioned condition. This further rotation of cam gear 9 causes the actuating lever 12 to pivot a certain angle about the fixed shaft 13 in anti-clockwise. As a result, the tension coil spring 16 is tensed, thereby generating a tension force. This tension force is applied to the connecting lever 15 in the direction of pivoting the connecting lever 15 about the connecting pin 14 in anti-clockwise. This pivoting force of the connecting lever 15 is transmitted to the pinch roller arm 4 and then to the pinch roller 3, thereby causing it to function as a pressing force against the capstan shaft 7.

On the other hand, the operation proceeding from the tape loading condition shown in FIG. 2 to the tape unloading condition shown in FIG. 1 is performed reversely. Accordingly, the detailed description thereof is omitted, for simplicity.

As apparent from the above description, the pinch roller pressing device of the present invention has a simple construction, thereby enabling more efficient use of the interior space of the appliance to which the device is applied. By virtue of the simple construction, the assembly and disassembly are also simplified.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A pinch roller pressing device for contacting a capstan shaft in a camera-integrated type VCR, consisting essentially of:

cam gear means including a cam groove;

a pivotally mounted angulated actuating lever having first and second arm members, said first arm member projecting toward and over said cam gear means and having an actuating pin at an outer end thereof for insertion in said cam groove;

a single intermediate connecting lever rotatably mounted on said second arm member of said actuating lever and having first and second arm segments, said first arm segment being connected to an outer end portion of said second arm member of said actuating lever by a tension coil spring attached to an outer end portion of said first arm segment;

an angulated pinch roller lever located adjacent and connectable to said connecting lever and having first and second arm portions, said pinch roller lever being pivotally mounted at an outer end of said first arm portion and having a pinch roller at an outer end of said second arm portion, said first arm portion of said pinch roller lever further having means connectable to said second arm segment of said connecting lever for being activated thereby when said actuating lever is moved from a first position to a second position upon rotation of said cam gear means;

a take-up arm located adjacent and pivotally connected to said pinch roller lever and being rotated in response to activation of said pinch roller lever;

whereby when said cam gear means rotates in one direction, the rotation thereof is directly transferred to said actuating lever and said connecting lever, said pinch roller lever being engaged thereby to move said pinch roller into contact with said capstan shaft.

2. The pinch roller pressing device of claim 1, wherein said connecting lever includes an engaging groove located at an outer end portion of said second arm segment, and said pinch roller lever includes a catch pin at an outer end of said second arm portion for engaging said groove of said connecting lever when said cam gear means rotates in said one direction.

3. The pinch roller pressing device of claim 1, wherein said first arm portion of said pinch roller lever includes a guide shaft and said take-up arm includes a cam slot adapted to receive said guide shaft of said pinch roller lever and wherein said take-up arm is rotated in response to movement of said pinch roller lever.

4. The pinch roller pressing device of claim 1 wherein said connecting lever includes an engaging groove located at an outer end portion of said second arm segment, and said pinch roller lever includes a catch pin at an outer end of said second arm portion for engaging said groove of said connecting lever when said cam gear means rotates in said one direction;

and wherein said first arm portion of said pinch roller lever includes a guide shaft and said take-up arm includes a cam slot adapted to receive said guide shaft of said pinch roller lever, said take-up arm being pivotally rotated in response to movement of said pinch roller lever.

5. The pinch roller pressing device of claim 4 wherein said cam groove comprises a spiral groove.

* * * * *